United States Patent
Byun

(10) Patent No.: US 12,099,751 B2
(45) Date of Patent: Sep. 24, 2024

(54) MEMORY SYSTEM, MEMORY CONTROLLER AND OPERATING METHOD OF THE MEMORY SYSTEM OPERATING AS READ BOOST MODE

(71) Applicant: SK hynix Inc., Icheon (KR)

(72) Inventor: Eu Joon Byun, Icheon (KR)

(73) Assignee: SK hynix Inc., Icheon (KR)

(*) Notice: Subject to any disclaimer, the term of this patent is extended or adjusted under 35 U.S.C. 154(b) by 102 days.

(21) Appl. No.: 18/046,832

(22) Filed: Oct. 14, 2022

(65) Prior Publication Data

US 2023/0376246 A1 Nov. 23, 2023

(30) Foreign Application Priority Data

May 20, 2022 (KR) .................. 10-2022-0062155

(51) Int. Cl.
G06F 3/06 (2006.01)
(52) U.S. Cl.
CPC .......... *G06F 3/0659* (2013.01); *G06F 3/0604* (2013.01); *G06F 3/064* (2013.01); *G06F 3/0673* (2013.01)
(58) Field of Classification Search
None
See application file for complete search history.

(56) References Cited

U.S. PATENT DOCUMENTS

| 8,886,990 | B2 | 11/2014 | Meir et al. | |
|---|---|---|---|---|
| 2012/0246391 | A1 | 9/2012 | Meir et al. | |
| 2016/0054922 | A1* | 2/2016 | Awasthi | G06F 3/0631 |
| | | | | 711/170 |
| 2020/0401530 | A1* | 12/2020 | Abulila | G06F 12/124 |
| 2021/0117122 | A1* | 4/2021 | Byun | G06F 3/0659 |
| 2021/0342094 | A1* | 11/2021 | Liu | G06F 3/0674 |
| 2021/0406203 | A1* | 12/2021 | Minopoli | G06F 12/10 |

FOREIGN PATENT DOCUMENTS

| KR | 1020180012653 A | 2/2018 |
|---|---|---|
| KR | 1020220105303 A | 7/2022 |

* cited by examiner

*Primary Examiner* — Edward J Dudek, Jr.
*Assistant Examiner* — Ralph A Verderamo, III

(57) ABSTRACT

A memory system, a memory controller, and an operating method of the memory system are provided. The memory system may include a memory device including a first type memory block and a second type memory block and a memory controller configured to determine, when receiving a command to set a read boost mode for the target logical address, whether the data corresponding to the target logical address can be copied from the first type memory block to the second type memory block, and copy the data corresponding to the target logical address from the first type memory block to the second type memory block.

12 Claims, 13 Drawing Sheets

BOOST_LIST

| IDX | LBA | ORIG_LOC |
|---|---|---|
| 0 | | |
| 1 | | |
| 2 | | |

⋮

| N | TGT_LBA | | original location of data
corresponding to TGT_LBA

MEMORY SYSTEM, MEMORY CONTROLLER AND OPERATING METHOD OF THE MEMORY SYSTEM OPERATING AS READ BOOST MODE

CROSS-REFERENCES TO RELATED APPLICATION

The present application claims priority under 35 U.S.C. 119(a) to Korean patent application number 10-2022-0062155 filed on May 20, 2022, which are incorporated herein by reference in its entirety.

TECHNICAL FIELD

The embodiments of the present disclosure relate to a memory system, a memory controller, and an operating method thereof, capable of operating in a read boost mode.

BACKGROUND

A memory system includes a data storage device that stores data on the basis of a request from a host such as a computer, a server, a smartphone, a tablet PC, or another electronic device. Examples of the memory system span from a traditional magnetic-disk-based hard disk drive (HDD) to a semiconductor-based data storage device such as a solid state drive (SSD), a universal flash storage (UFS) device, an embedded MMC (eMMC) device, or the like.

The memory system may further include a memory controller for controlling the data storage device, e.g., a memory device. The memory controller may receive a command from the host and, on the basis of the received command, may execute an operation relating to the command or control read/write/erase operations on the memory device in the memory system. The memory controller may be used to execute firmware to perform a logical operation for controlling such operations.

In general, the host may set properties (e.g., read-only, hidden, or the like) of data to be stored in the memory system. However, the memory system does not know the properties of data that the host has set. In addition, it is difficult for the memory system to predict a usage pattern of the host for the data it stores. Therefore, it is difficult for the memory system to directly predict a requirement of the host and execute a read request from the host accordingly.

SUMMARY

Embodiments of the present disclosure may provide a memory system, a memory controller, and an operating method thereof, capable of processing a read request from a host at a higher speed.

In one aspect, an embodiment of the present disclosure may provide a memory system including i) a memory device including a first type memory block storing data corresponding to a target logical address and a second type memory block operating at a higher speed than the first type memory block, and ii) a memory controller configured to determine, when receiving a command to set a read boost mode for the target logical address from outside of the memory system, whether the data corresponding to the target logical address can be copied from the first type memory block to the second type memory block, and copy, when it is determined that the data corresponding to the target logical address can be copied to the second type memory block, the data corresponding to the target logical address from the first type memory block to the second type memory block.

In another aspect, an embodiment of the present disclosure may provide a memory controller including i) a memory interface capable of communicating with a memory device including a first type memory block storing data corresponding to a target logical address and a second type memory block operating at a higher speed than the first type memory block, and ii) a control circuit configured to determine, when receiving a command to set a read boost mode for the target logical address from outside of the memory system, whether the data corresponding to the target logical address can be copied from the first type memory block to the second type memory block, and copy, when it is determined that the data corresponding to the target logical address can be copied to the second type memory block, the data corresponding to the target logical address from the first type memory block to the second type memory block.

In another aspect, an embodiment of the present disclosure may provide an operating method of a memory system including i) receiving a command to set a read boost mode for a target logical address from outside of the memory system, ii) determining whether data corresponding to the target logical address can be copied from a first type memory block, in which the data corresponding to the target logical address is stored, to a second type memory block operating at a higher speed than the first type memory block, and iii) copying, when it is determined that the data corresponding to the target logical address can be copied to the second type memory block, the data corresponding to the target logical address from the first type memory block to the second type memory block.

According to embodiments of the present disclosure, it is possible to process the read request from the host at a higher speed.

DETAIL DESCRIPTION OF THE EXEMPLARY EMBODIMENTS

Figure 1:
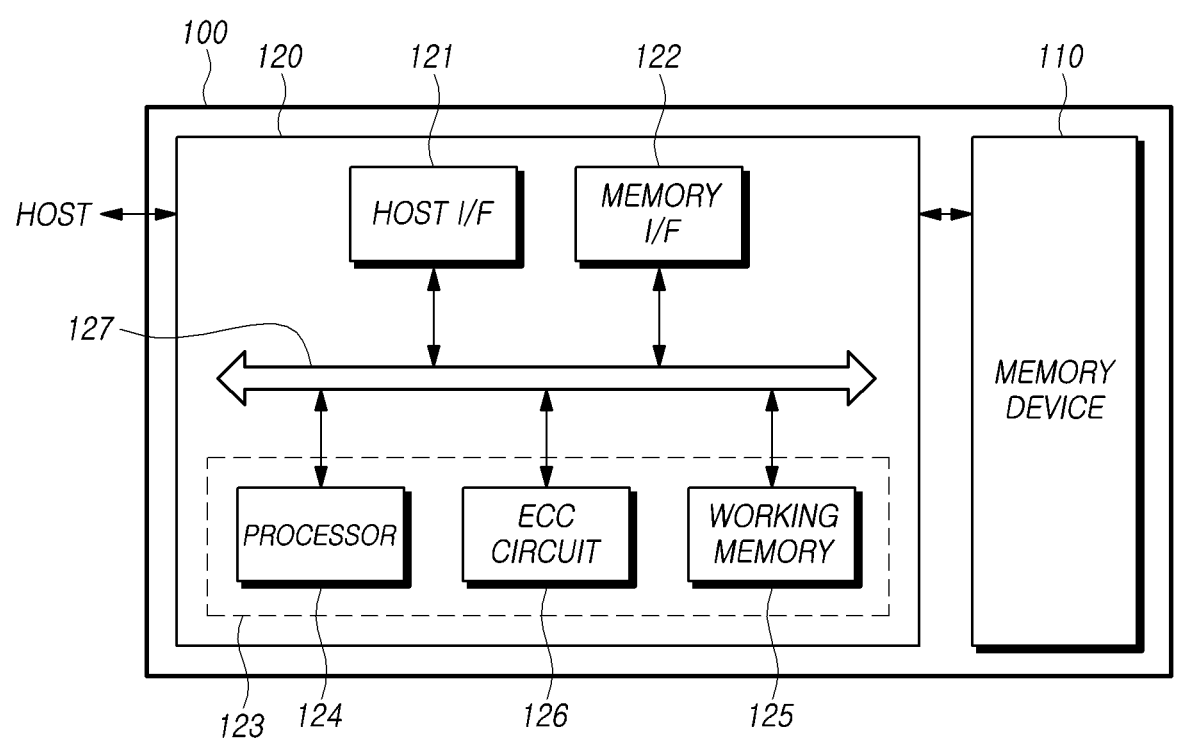
FIG. 1 is a schematic diagram of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers and other signal generating and signal processing features may include, for example, a memory or other storage device for storing code or instructions to be executed, for example, by a computer, processor, microprocessor, controller, or other signal processing device.

FIG. 1 illustrates a memory system 100 based on an embodiment of the disclosed technology.

Referring to FIG. 1, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into the multiple memory blocks and each memory block includes a plurality of pages of memory cells. In typical implementations of NAND flash memory devices, a page of memory cells is the smallest memory unit for programming or writing data, and data stored in memory cells can be erased at a block level. That is, a memory block is the smallest memory unit for erasing data stored in the memory device 110.

In some embodiments, the memory device 110 may be implemented as one or more of various memory devices including a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (SU-RAM), and the like.

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material. Such a flash memory device can be called a charge trap flash (CTF).

The memory device 110 may be configured to receive a command and an address from the memory controller 120 to access a memory area of the memory cell array selected using the address. That is, the memory device 110 may perform an operation corresponding to the received command on the memory area of the memory cell array that is indicated by a physical address corresponding to the received address.

The memory device 110 may perform a program operation, a read operation, an erasure operation, and the like. During the program operation, the memory device 110 may write data in the memory area selected by the address. During the read operation, the memory device 110 may read data from the memory area selected by the address. During the erasure operation, the memory device 110 may erase data stored in the memory area selected by the address.

The memory controller 120 may control write (or program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host HOST. Alternatively, the memory controller 120 may control the operation of the memory device 110 even in the absence of any request from the host HOST when it performs such background operations of the memory device 110.

The memory controller 120 and the host HOST may be separate devices. In some embodiments, the memory controller 120 and the host HOST may be integrated and implemented as a single device. In the following description, the memory controller 120 and the host HOST will be described as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host HOST.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage operations of the memory system 100. The processor 124 may translate a logical block address (LBA) provided by the host HOST into a physical block address (PBA) through the FTL. The FTL may receive the LBA and translate the LBA into the PBA by using a mapping table.

There are various address mapping methods which may be employed by the FTL, based on a mapping unit. Typical address mapping methods may include a page mapping method, a block mapping method, and a hybrid mapping method.

The processor 124 may be configured to randomize data received from the host HOST to write the randomized data to the memory cell array in the memory device 110. For example, the processor 124 may randomize data received from the host HOST by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (or drive) firmware loaded into the working memory 125 during booting.

The firmware refers to a program or software stored in a certain nonvolatile memory and is executed inside the memory system 100.

In some embodiments, the firmware may include various functional layers. For example, the firmware may include at least one of a flash translation layer (FTL) configured to translate a logical address received from the host HOST to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), a synchronous RAM (SDRAM), and the like, which are volatile memory devices.

The error detection/correction circuit 126 may be configured to detect and correct one or more erroneous bits in data by using an error detection and correction code. In some implementations, the data that is subject to the error detection and correction may include data stored in the working memory 125 and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, read data may be divided into multiple sectors. In this patent document, a sector may refer to a data unit that is smaller than a read unit (e.g., page) of a flash memory. The sectors constituting the read data may be mapped based on addresses.

In some implementations, the error detection/correction circuit 126 may calculate a bit error rate (BER) and determine whether the number of erroneous bits in the read data is within the error correction capability sector by sector. For example, if the BER is higher than a reference value, the error detection/correction circuit 126 may determine that erroneous bits in a corresponding sector are uncorrectable and the corresponding sector is marked as "fail." If the BER is lower than or equal to the reference value, the error detection/correction circuit 126 may determine that the corresponding sector is correctable or the corresponding sector can be marked as "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., addresses of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
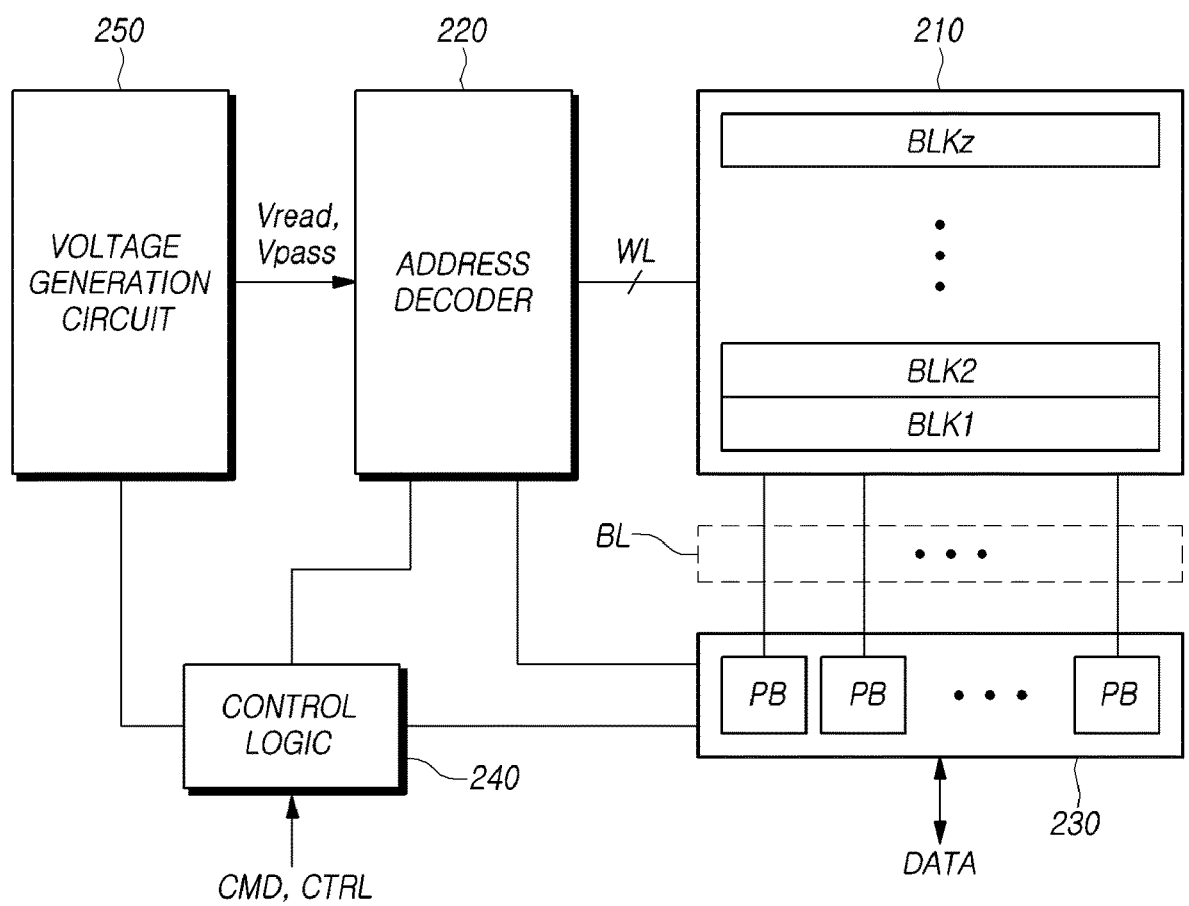
FIG. 2 is a block diagram of a memory device based on an embodiment of the disclosed technology.

FIG. 2 illustrates a memory device 110 based on an embodiment of the disclosed technology. The memory device 110 of FIG. 2 may correspond to the memory device 110 of FIG. 1.

Referring to FIG. 2, the memory device 110 may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged at intersections of the rows and the columns.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some embodiments, such nonvolatile memory cells may be arranged in a vertical channel structure.

The memory cell array 210 may be configured as a memory cell array having a two-dimensional structure. In some embodiments, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data. As another example, each of the multiple memory cells included in the memory cell array 210 may be a triple-level cell (TLC) configured to store three bits of data. As another example, each of the multiple memory cells included in the memory cell array 210 may be a quad-level cell (QLC) configured to store four bits of data. As another example, the memory cell array 210 may include multiple memory cells, each of which may be configured to store at least five bits of data.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address, respectively. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some embodiments, may further include a cache buffer for data caching.

The multiple page buffers PB may be connected to the memory cell array 210 through the multiple bit lines BL. In order to detect or sense a threshold voltage Vth of the memory cells during a read operation and a program verification operation, the multiple page buffers PB may continuously supply a sensing current to the bit lines BL connected to the memory cells to detect, at a sensing node, a voltage change proportional to an amount of current that varies depending on a program state of a corresponding memory cell, and may hold or latch a corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting voltage levels of sensing nodes of multiple page buffers PB to a pre-charge voltage level.

The control logic 240 may control the read/write circuit 230 to perform a read operation in the memory cell array 210. The voltage generation circuit 250 may generate the read voltage Vread and the pass voltage Vpass, which are used during the read operation, in response to a voltage generation circuit control signal output from the control logic 240.

A memory block BLK included in the memory device 110 may include multiple pages PG. In some embodiments, a plurality of memory cells arranged in a column form a memory cell string STR, and a plurality of memory cells arranged in a row form a page PG. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in a row direction, and each of the multiple bit lines BL may be arranged in a column direction. As another example, each of the multiple word lines WL may be arranged in the column direction, and each of the multiple bit lines BL may be arranged in the row direction.

In some embodiments, the multiple word lines WL and the multiple bit lines BL may intersect with each other, thereby addressing a single memory cell in an array of multiple memory cells MC. In some embodiments, each memory cell MC may include a transistor TR that includes a material layer capable of holding an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to a source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some embodiments, at least one dummy word line may be additionally arranged between the first outermost word line and the first selection line. In addition, at least one dummy word line may be additionally arranged between the second outermost word line and the second selection line.

A read operation and a program operation (or write operation) of the memory block may be performed page by page, and an erasure operation may be performed memory block by memory block.

Figure 3:
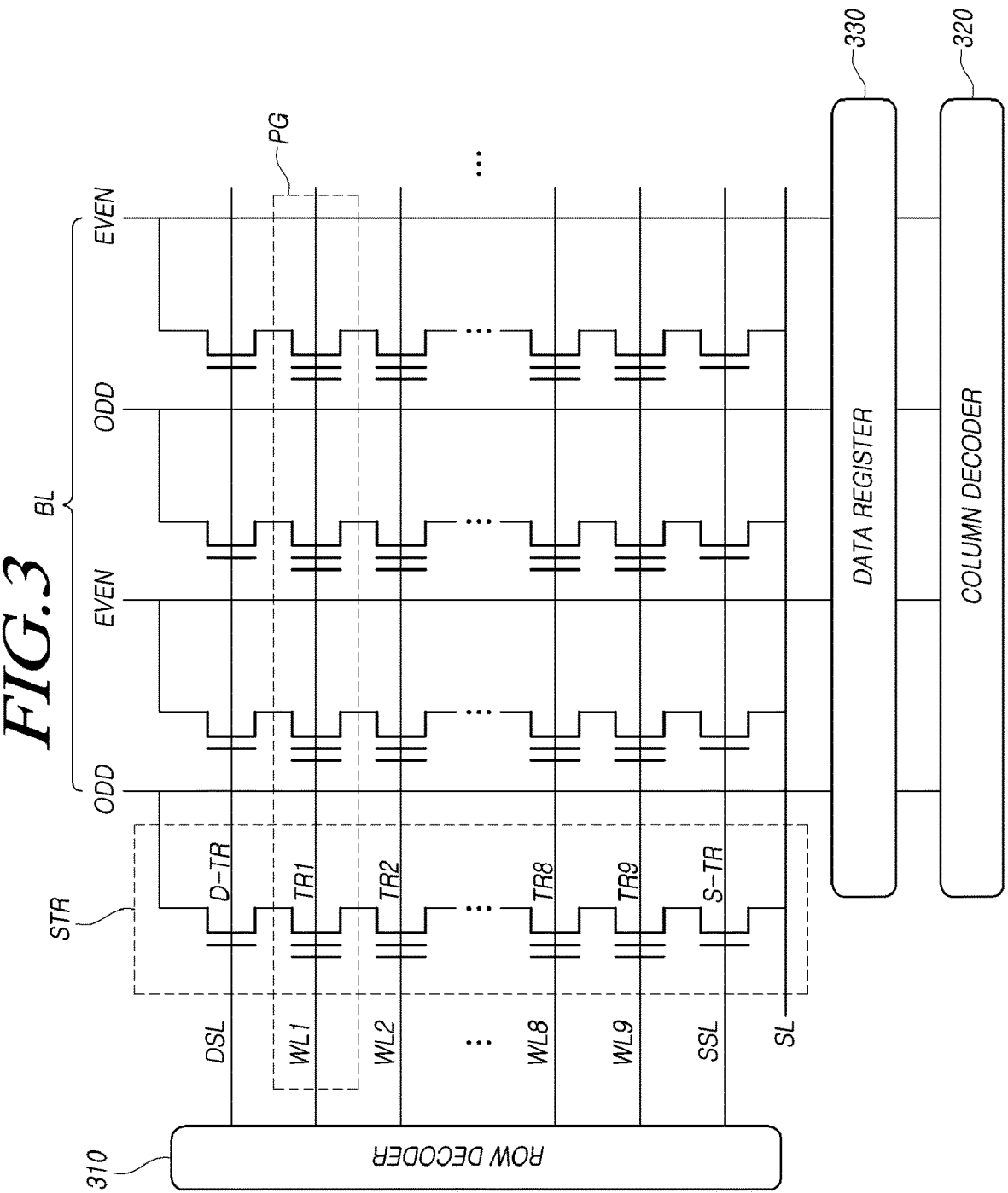
FIG. 3 illustrates a structure of word lines and bit lines of a memory device based on an embodiment of the disclosed technology.

FIG. 3 illustrates a structure of multiple word lines WL and multiple bit lines BL of a memory device 110 based on an embodiment of the disclosed technology. The memory device 110 of FIG. 3 may correspond to the memory device 110 of FIG. 1 or 2.

Referring to FIG. 3, the memory device 110 has a core area in which memory cells MC are arranged, and an auxiliary area (the remaining area other than the core area) to include circuitry that is used to perform operations of a memory cell array, e.g., the memory cell array 210 of FIG. 2.

In the core area, a certain number of memory cells arranged in one direction can be called a "page" PG, and a certain number of memory cells that are coupled in series can be called a "memory cell string" STR.

The multiple word lines WL1-WL9 may be connected to a row decoder 310. The multiple bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to a corresponding one of the multiple pages PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and thus, when conducting a program operation and a read operation, the operations are simultaneously performed on all memory cells MC within the same page PG.

The multiple bit lines BL may be connected to the column decoder 320. In some embodiments, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on addresses.

In some embodiments, the data register 330 plays an important role because all data processing by the memory device 110, including program and read operations, occurs via the data register 330. If data processing by the data register 330 is delayed, all of the other constituent elements need to wait until the data register 330 finishes the data processing, degrading the overall performance of the memory device 110.

Referring to the example illustrated in FIG. 3, in one memory cell string STR, multiple transistors TR1-TR9 may be connected to the multiple word lines WL1-WL9, respectively. In some embodiments, the multiple transistors TR1-TR9 correspond to memory cells MC, respectively. In this example, each of the multiple transistors TR1-TR9 includes a control gate and a floating gate.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

A first selection transistor D-TR, which is controlled to turn on/off by the first selection line DSL, has a gate electrode connected to the first selection line DSL, but includes no floating gate. A second selection transistor S-TR, which is controlled to turn on/off by the second selection line SSL, has a gate electrode connected to the second selection line SSL, but includes no floating gate.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some embodiments, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 of FIG. 1 turns on both of the first and second selection transistors D-TR and S-TR during a read operation or a program verification operation. Accordingly, during the read operation or the program verification operation, an electric current may flow through the corresponding memory cell string STR and drain to the source line SL, which corresponds to the ground, such that a voltage level of a corresponding bit line BL can be measured. However, during the read operation, there may be a time difference in the on/off timings of the first selection transistor D-TR and the second selection transistor S-TR.

The memory system 100 may apply a predetermined voltage (e.g., +20V) to a substrate through the source line SL during an erasure operation. The memory system 100 applies a certain voltage to allow both the first selection transistor D-TR and the second selection transistor S-TR to float during the erasure operation. As a result, the applied erasure voltage can remove electrical charges from floating gates of selected memory cells.

Figure 4:
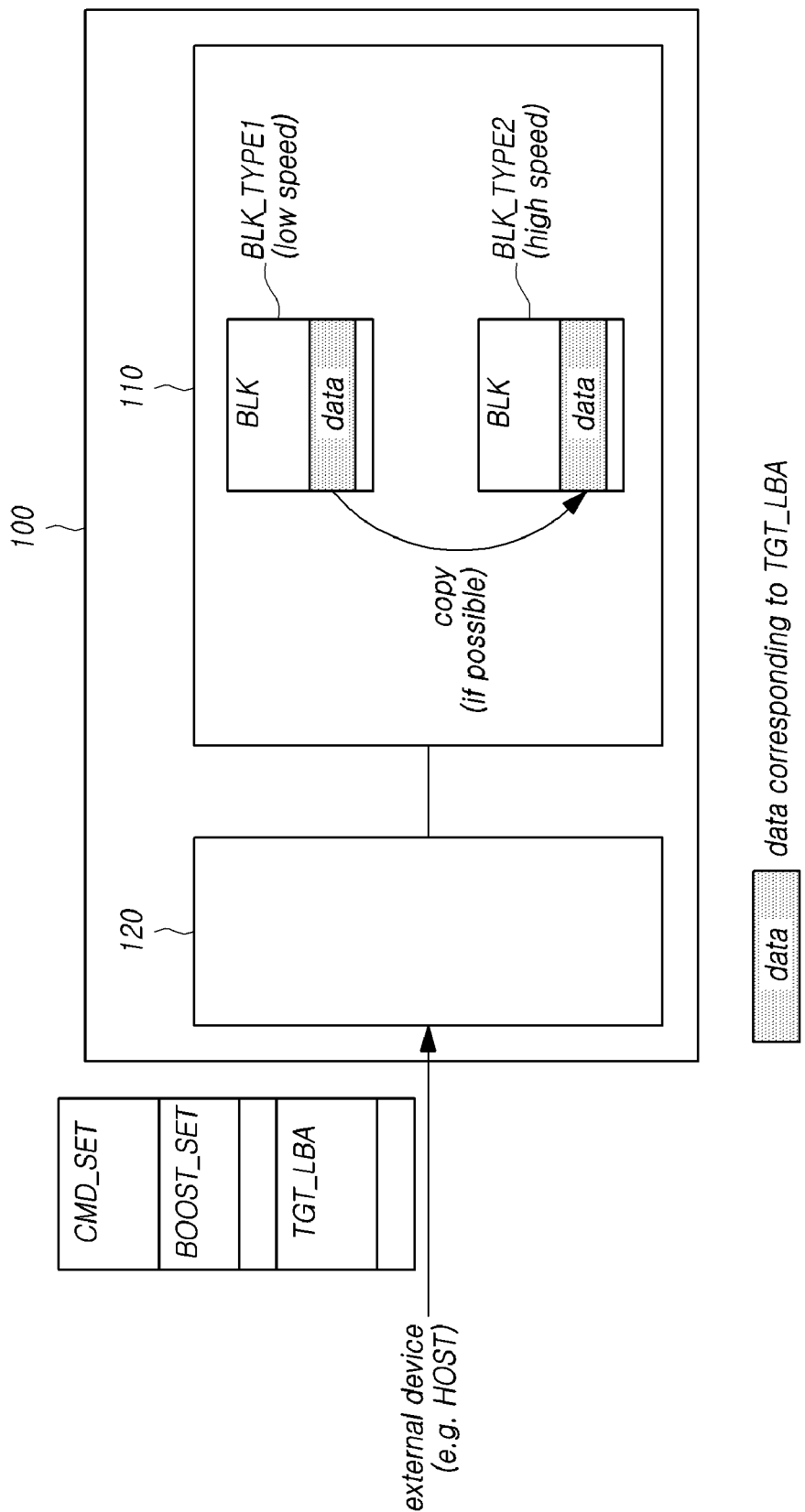
FIG. 4 and FIG. 5 illustrate an operation of setting a read boost mode for a target logical address according to an embodiment of the present disclosure.
Figure 5:
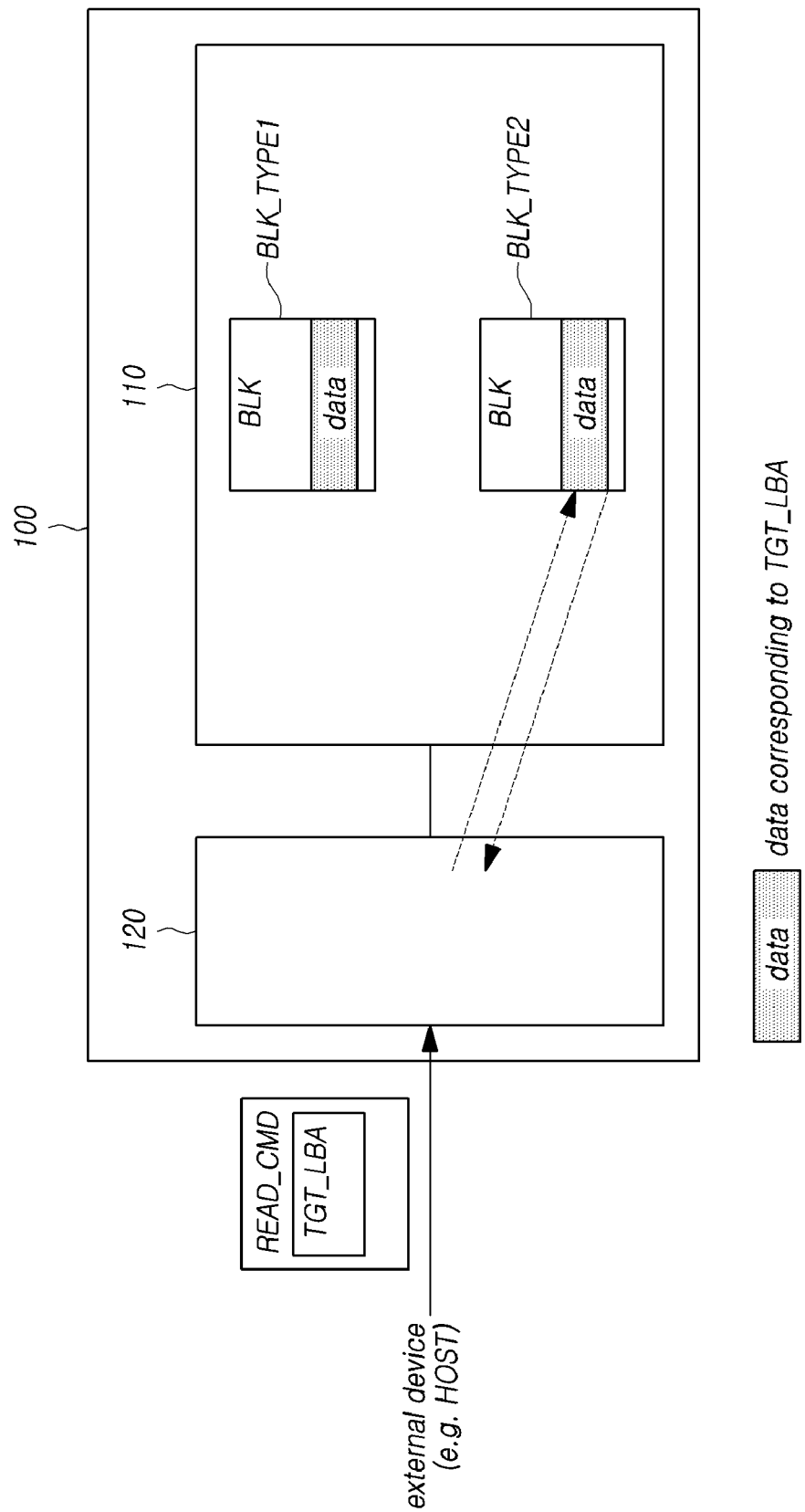

FIG. 4 and FIG. 5 illustrate an operation of setting a read boost mode for a target logical address TGT_LBA according to an embodiment of the present disclosure. The operation illustrated in FIGS. 4 and 5 may be executed by a memory system 100 that corresponds to the memory system 100 of FIG. 1.

Referring to FIG. 4, the memory system 100 may include the memory device 110 and the memory controller 120.

The memory device 110 may include a first type memory block BLK_TYPE1 and a second type memory block BLK_TYPE2. Each of the first type memory block BLK_TYPE1 and the second type memory block BLK_TYPE2 is one of a plurality of memory blocks BLK in the memory device 110.

The first type memory block BLK_TYPE1 is a memory block storing data corresponding to the target logical address TGT_LBA. The target logical address TGT_LBA may be defined as a specific logical address.

The second type memory block BLK_TYPE2 is a memory block operating at a higher speed than the first type memory block BLK_TYPE1. In this case, the second type memory block BLK_TYPE2 may have a smaller storage capacity than the first type memory block BLK_TYPE1 instead of operating at a higher speed than the first type memory block BLK_TYPE1. The number of data bits per memory cell included in the second type memory block BLK_TYPE2 may be less than the number of data bits per memory cell included in the first type memory block BLK_TYPE1.

For example, the first type memory block BLK_TYPE1 may be an MLC memory block, a TLC memory block, or a QLC memory block, and the second type memory block BLK_TYPE2 may be an SLC memory block.

In FIG. 4, the memory controller 120 may receive a command CMD_SET to set the read boost mode for the target logical address TGT_LBA from outside of the memory system 100, e.g., an external device. For example, the external device may be the host HOST.

The command CMD_SET may include first information BOOST_SET to set the read boost mode for the target logical address TGT_LBA and further include second information on the target logical address TGT_LBA.

For example, the command CMD_SET may be a separately defined command to set the read boost mode for the target logical address TGT_LBA.

As another example, the command CMD_SET may be a command instructing a predefined operation (e.g., read operation). In this case, the memory controller 120 may determine whether the first information BOOST_SET exists in the command CMD_SET instructing the read operation.

When a read boost mode is set for a specific logical address, the memory controller 120 may support data corresponding to the specific logical address to be read at a higher speed than in a basic state in which the read boost mode for the specific logical address is reset.

When the read boost mode is set for the target logical address TGT_LBA, the memory controller 120 may control the memory device 110 to read the data corresponding to the target logical address TGT_LBA from the second type memory block BLK_TYPE2. This is because the second type memory block BLK_TYPE2 operates at a higher speed than the first type memory block BLK_TYPE1 as described above.

When receiving the command CMD_SET to set the read boost mode for the target logical address TGT_LBA, the memory controller 120 may determine whether the data corresponding to the target logical address TGT_LBA can be copied from the first type memory block BLK_TYPE1 to the second type memory block BLK_TYPE2.

When the data corresponding to the target logical address TGT_LBA can be copied from the first type memory block BLK_TYPE1 to the second type memory block BLK_TYPE2, the memory controller 120 may copy the data corresponding to the target logical address TGT_LBA from the first type memory block BLK_TYPE1 to the second type memory block BLK_TYPE2. In this case, the memory controller 120 may transmit a first response, which indicates that the read boost mode is normally set for the target logical address TGT_LBA, to the external device, e.g., the host HOST.

On the other hand, when the data corresponding to the target logical address TGT_LBA cannot be copied from the first type memory block BLK_TYPE1 to the second type memory block BLK_TYPE2, the memory controller 120 may transmit a second response, which indicates that setting the read boost mode for the target logical address TGT_LBA is failed, to the external device, e.g., the host HOST.

Referring to FIG. 5, the memory controller 120 receives a read command READ_CMD from the external device, e.g., the host HOST, and processes the read command READ_CMD, after the data corresponding to the target logical address TGT_LBA has been copied from the first type memory block BLK_TYPE1 to the second type memory block BLK_TYPE2.

In FIG. 5, the memory controller 120 receives the read command READ_CMD to read the data corresponding to the target logical address TGT_LBA.

In this case, the memory controller 120 may read the data corresponding to the target logical address TGT_LBA from the second type memory block BLK_TYPE2. This is because, since the second type memory block BLK_TYPE2 operates at a higher speed than the first type memory block BLK_TYPE1 as described above, the memory controller 120 can more quickly process the read command READ_CMD when the data corresponding to the target logical address TGT_LBA is read from the second type memory block BLK_TYPE2.

Figure 6:
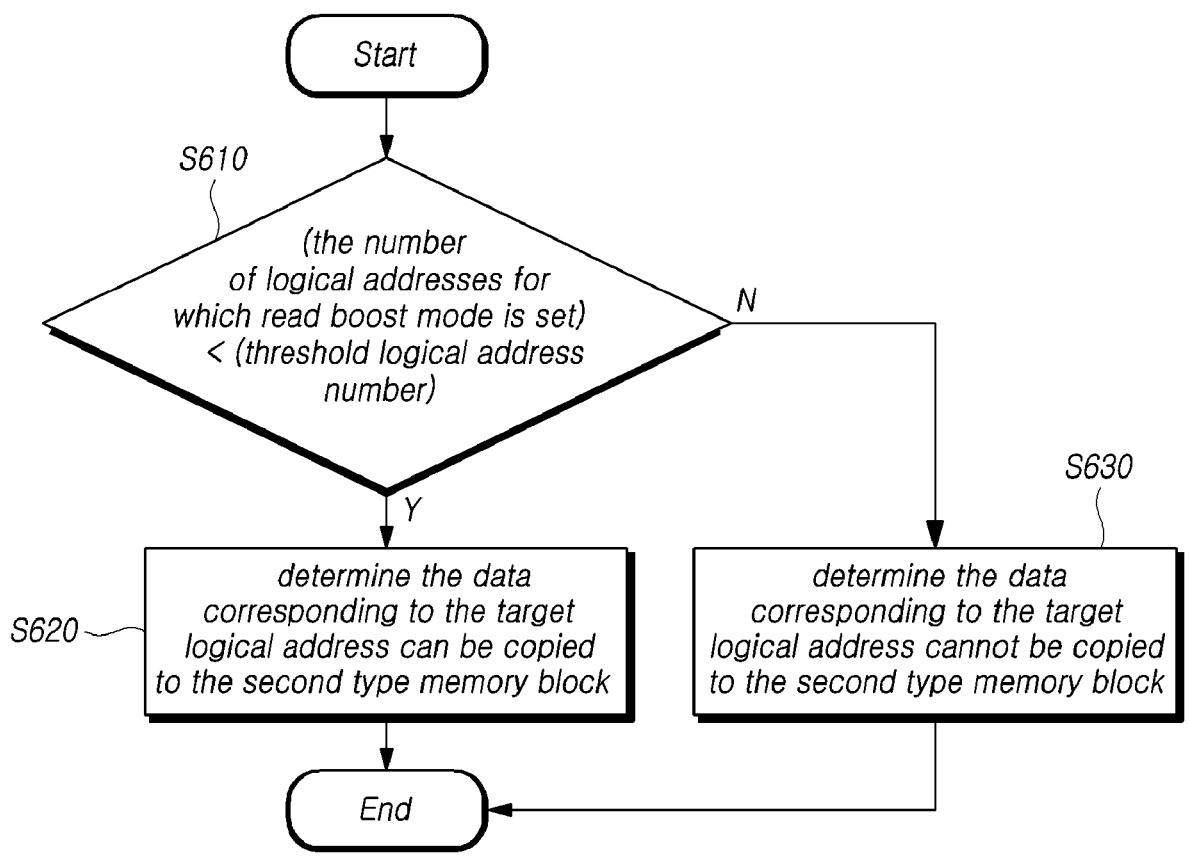
FIG. 6 illustrates an operation of determining whether data corresponding to a target logical address can be copied to a second type memory block according to an embodiment of the present disclosure.

FIG. 6 illustrates an operation of determining whether data corresponding to a target logical address TGT_LBA can be copied to a second type memory block BLK_TYPE2 according to an embodiment of the present disclosure. The operation illustrated in FIG. 6 will be understood with reference to the memory system 100 shown in FIG. 4 or 5.

Referring to FIG. 6, a memory controller, e.g., the memory controller 120, may determine whether the number of logical addresses for which a read boost mode is set is less than a threshold logical address number (S610).

In this case, the threshold logical address number may be the maximum value of the number of logical addresses for which the read boost mode can be set. Since a size of data that can be stored in the second type memory block BLK_TYPE2 is limited, the number of logical addresses for which the read boost mode can be set is also limited. That is, the maximum value is predetermined.

When the number of logical addresses for which the read boost mode is set is less than the threshold logical address number (S610—Y), the memory controller 120 may determine that the data corresponding to the target logical address TGT_LBA can be copied to the second type memory block BLK_TYPE2 (S620).

On the other hand, when the number of logical addresses for which the read boost mode is set is greater than or equal to the threshold logical address number (S610—N), the memory controller 120 may determine that the data corresponding to the target logical address TGT_LBA cannot be copied to the second type memory block BLK_TYPE2 (S630).

Meanwhile, in order to execute the operation illustrated in FIG. 6, the memory controller 120 of the memory system 100 needs to know the number of logical addresses for which the read boost mode is set. To this end, the memory controller 120 may manage a logical address for which the read boost mode is set. The memory controller 120 may use various types of data structures (e.g., list, table, array) to manage the logical address for which the read boost mode is set.

Figure 7:
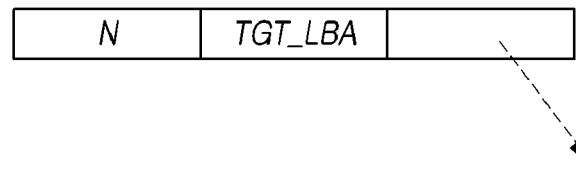
FIG. 7 illustrates an example of how a memory system manages a logical address for which a read boost mode is set according to an embodiment of the present disclosure.

FIG. 7 illustrates an example of how a memory system manages a logical address for which a read boost mode is set according to an embodiment of the present disclosure. The memory system of FIG. 7 may correspond to the memory system 100 of FIG. 1.

Referring to FIGS. 1 and 7, the memory controller 120 of the memory system 100 may manage a boost list BOOST_LIST that stores information on logical addresses LBA for each of which the read boost mode is set.

In FIG. 7, information on a specific logical address for which the read boost mode is set may be stored in a field corresponding to a specific index IDX in the boost list BOOST_LIST.

For example, the memory controller 120 may input information on the target logical address TGT_LBA into a field indicated by an N-th index IDX of the boost list BOOST_LIST, N being an integer greater than or equal to 0. This indicates that the read boost mode is set for the target logical address TGT_LBA.

When the read boost mode is set for the target logical address TGT_LBA, the memory controller 120 may also input an original location ORIG_LOC of data corresponding to the target logical address TGT_LBA in the field indicated by the N-th index IDX of the boost list BOOST_LIST. The original location ORIG_LOC of the data corresponding to the target logical address TGT_LBA indicates a location (e.g., physical address) in which the data corresponding to the target logical address TGT_LBA is stored in the first type memory block BLK_TYPE1 before the read boost mode is set for the target logical address TGT_LBA.

Meanwhile, after copying the data corresponding to the target logical address TGT_LBA from the first type memory block BLK_TYPE1 to the second type memory block BLK_TYPE2, the memory system 100 needs to change mapping information corresponding to the target logical address TGT_LBA to access the second type memory block BLK_TYPE2, so that the data corresponding to the target logical address TGT_LBA can be read out of the second type memory block BLK_TYPE2. Hereinafter, this will be described in detail with reference to FIG. 8.

Figure 8:
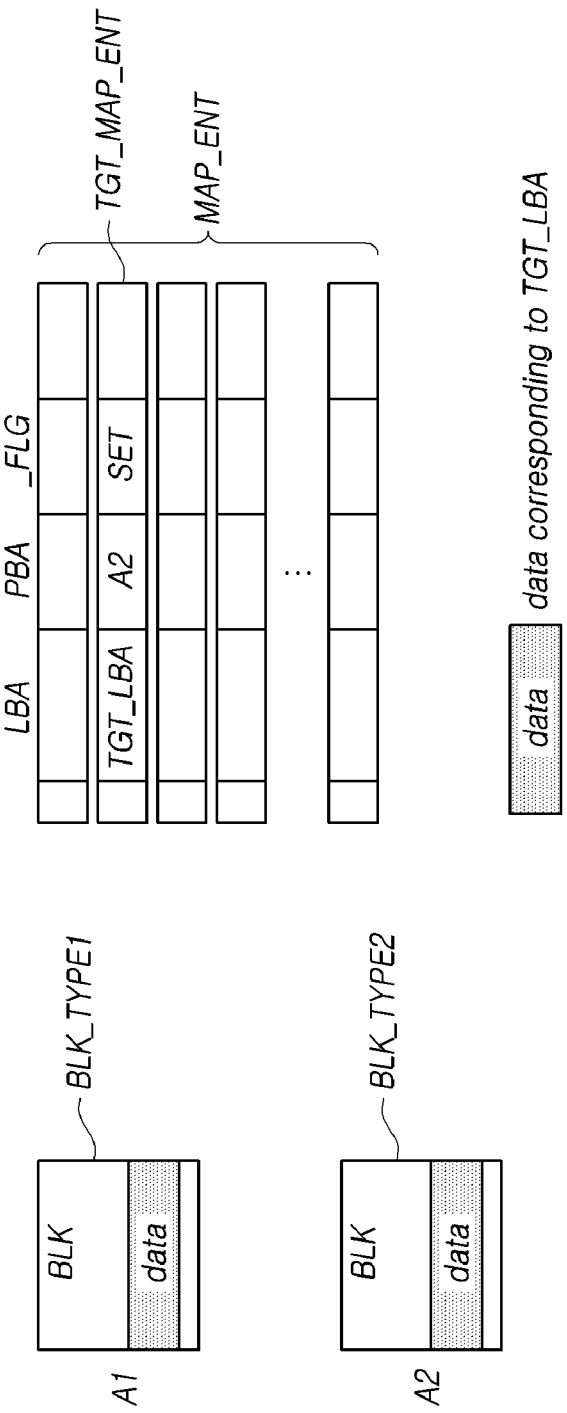
FIG. 8 illustrates an operation of changing a mapping entry corresponding to a target logical address according to an embodiment of the present disclosure.

FIG. 8 illustrates an operation of changing a mapping entry corresponding to the target logical address TGT_LBA according to an embodiment of the present disclosure.

Referring to FIG. 8, after copying the data corresponding to the target logical address TGT_LBA from the first type memory block BLK_TYPE1 to the second type memory block BLK_TYPE2, the memory controller 120 of the memory system 100 may search a mapping entry TGT_MAP_ENT corresponding to the target logical address TGT_LBA among a plurality of mapping entries MAP_ENT.

Each of the plurality of mapping entries MAP_ENT may store mapping information between a logical address LBA and a physical address PBA. The plurality of mapping entries MAP_ENT may be included in a mapping table. The plurality of mapping entries MAP_ENT may be stored in the memory device 110, and may be cached in a specific area (e.g., the working memory 125 of FIG. 1) of the memory controller 120 when the memory system 100 is booted.

The mapping entry TGT_MAP_ENT corresponding to the target logical address TGT_LBA may include information on a physical address PBA mapped to the target logical address TGT_LBA.

Referring to FIG. 8, a physical address at which the data corresponding to the target logical address TGT_LBA is stored in the first type memory block BLK_TYPE1 is A1, and a physical address at which the data corresponding to the target logical address TGT_LBA is stored in the second type memory block BLK_TYPE2 is A2.

In this case, the memory controller 120 may search the mapping entry TGT_MAP_ENT corresponding to the target logical address TGT_LBA among the plurality of mapping entries MAP_ENT, and set a read boost flag BOOST_FLG in the mapping entry TGT_MAP_ENT corresponding to the target logical address TGT_LBA.

A read boost flag BOOST_FLG of a mapping entry is a flag indicating whether a read boost mode is set for a logical address LBA corresponding to the mapping entry.

As described above, after the read boost mode is set for the target logical address TGT_LBA, the data corresponding to the target logical address TGT_LBA is read from the second type memory block BLK_TYPE2 instead of the first type memory block BLK_TYPE1.

Accordingly, in order to indicate that the memory controller 120 reads the data corresponding to the target logical address TGT_LBA from the second type memory block BLK_TYPE2, the memory controller 120 may set the read boost flag BOOST_FLG of the mapping entry TGT_MAP_ENT corresponding to the target logical address TGT_LBA.

In this case, a physical address field PBA of the mapping entry TGT_MAP_ENT corresponding to the target logical address TGT_LBA may be set to A2, which is a physical address of the second type memory block BLK_TYPE2 in which the data corresponding to the target logical address TGT_LBA is stored.

In the above, the operation of the memory system 100 in which the read boost mode is set for the target logical address TGT_LBA has been described.

Meanwhile, the memory system 100 may receive a request to reset the read boost mode set for the target logical address TGT_LBA from an external device, e.g., the host HOST. For example, when it is no longer necessary to read the data corresponding to the target logical address TGT_LBA at a high speed, the memory system 100 may receive the request to reset the read boost mode set for the target logical address TGT_LBA. Hereinafter, an operation in which the memory system 100 resets the read boost mode set for the target logical address TGT_LBA will be described.

Figure 9:
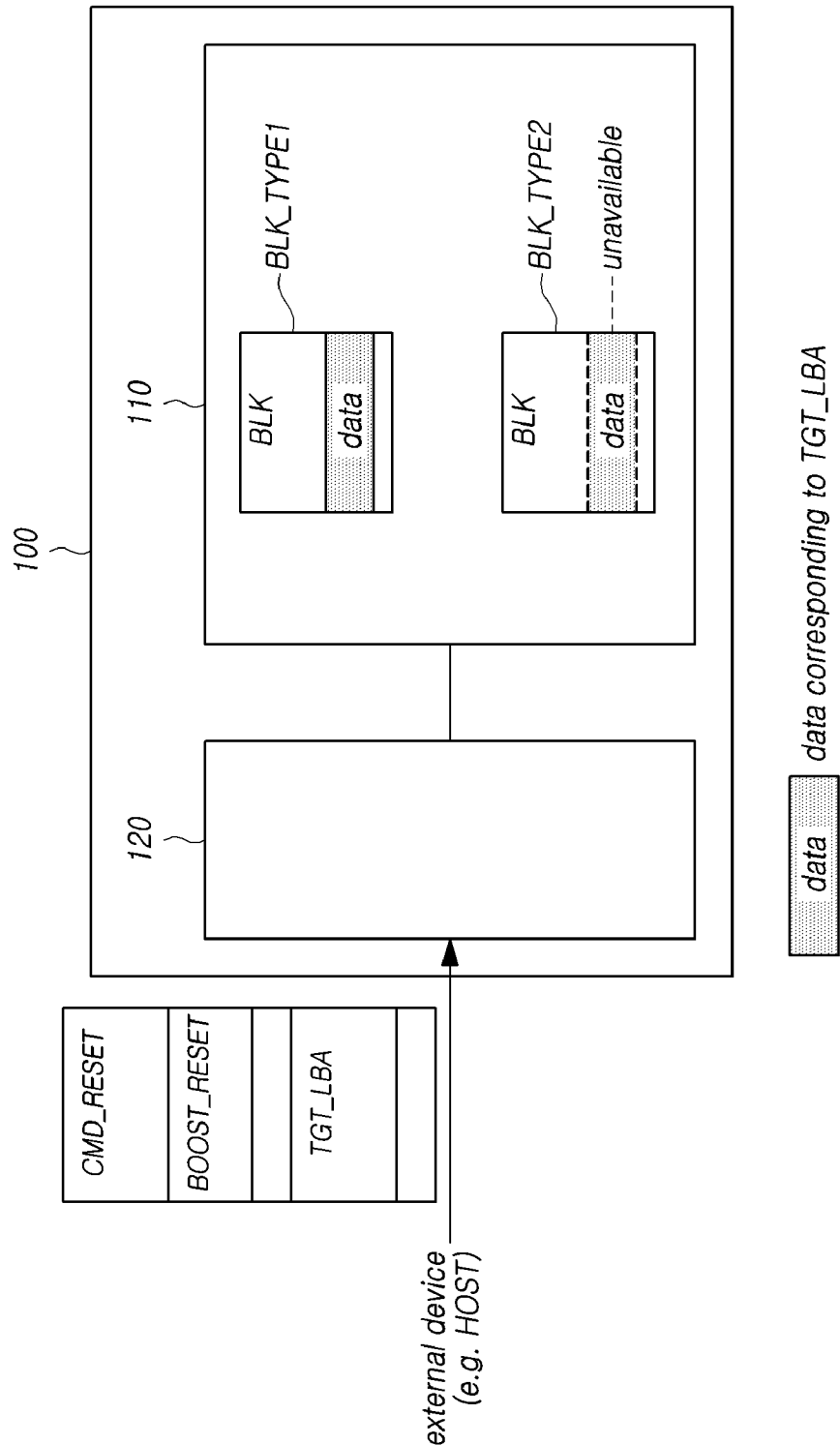
FIG. 9 and FIG. 10 illustrate an operation of resetting a read boost mode for a target logical address according to an embodiment of the present disclosure.
Figure 10:
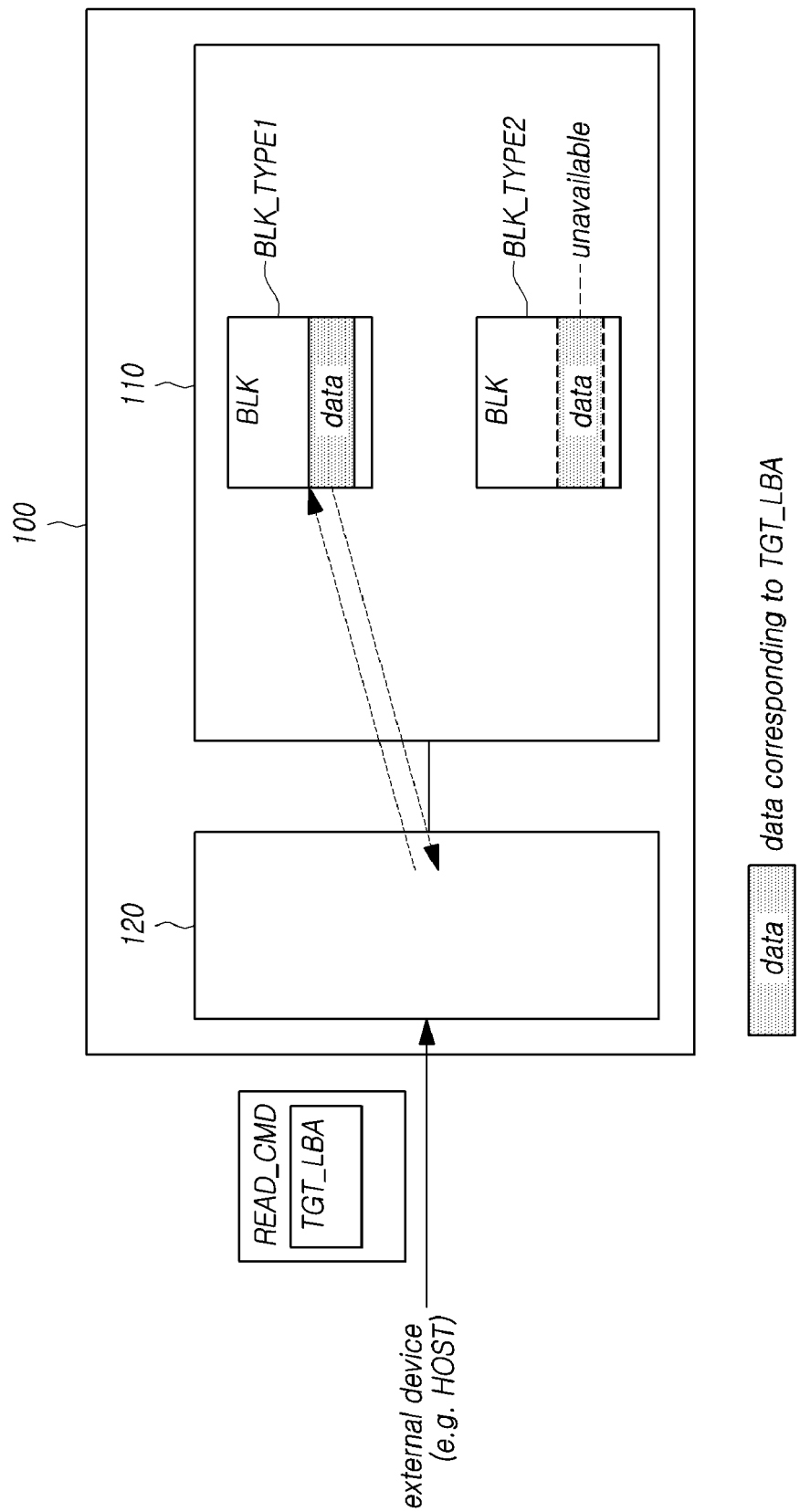

FIG. 9 and FIG. 10 illustrate an operation of resetting a read boost mode set for a target logical address TGT_LBA according to an embodiment of the present disclosure. The operation illustrated in FIGS. 9 and 10 may be executed by the memory system 100 of FIG. 1.

Referring to FIG. 9, the memory controller 120 of the memory system 100 may receive a command CMD_RESET to reset the read boost mode set for the target logical address TGT_LBA from an external device, e.g., the host HOST.

This command CMD_RESET may include first information BOOST_RESET indicating resetting the read boost mode set for the target logical address TGT_LBA and second information on the target logical address TGT_LBA.

For example, the above-described command CMD_RESET may be a separately defined command to reset the read boost mode set for the target logical address TGT_LBA.

As another example, the command CMD_RESET may be the same type of command as the command CMD_SET described with reference to FIG. 4.

As another example, the above-described command CMD_RESET may be a command instructing a predefined operation (e.g., a read operation). The memory controller 120 may determine whether the first information BOOST_RESET exists in the command CMD_RESET instructing the read operation.

When receiving the command CMD_RESET to reset the read boost mode set for the target logical address TGT_LBA from the external device, e.g., the host HOST, the memory controller 120 may set the data corresponding to the target logical address TGT_LBA stored in the second type memory block BLK_TYPE2 to be inaccessible.

For example, the memory controller 120 may directly delete the data corresponding to the target logical address TGT_LBA from the second type memory block BLK_TYPE2. As another example, the memory controller 120 may set the data corresponding to the target logical address TGT_LBA stored in the second type memory block BLK_TYPE2 as invalid data.

In this case, the data corresponding to the target logical address TGT_LBA may be read only from the first type memory block BLK_TYPE1.

FIG. 10 illustrates an operation of processing a read command READ_CMD after the data corresponding to the target logical address TGT_LBA stored in the second type memory block BLK_TYPE2 is set to be inaccessible.

In FIG. 10, the memory controller 120 receives the read command READ_CMD to read the data corresponding to the target logical address TGT_LBA.

In this case, the memory controller 120 may read the data corresponding to the target logical address TGT_LBA from the first type memory block BLK_TYPE1. This is because the data corresponding to the target logical address TGT_LBA stored in the second type memory block BLK_TYPE2 is no longer accessible.

Meanwhile, the memory controller 120 may change mapping information corresponding to the target logical address TGT_LBA to access the first type memory block BLK_TYPE1, so that the data corresponding to the target logical address TGT_LBA can be read only from the first type memory block BLK_TYPE1. Hereinafter, this will be described in detail with reference to FIG. 11.

Figure 11:
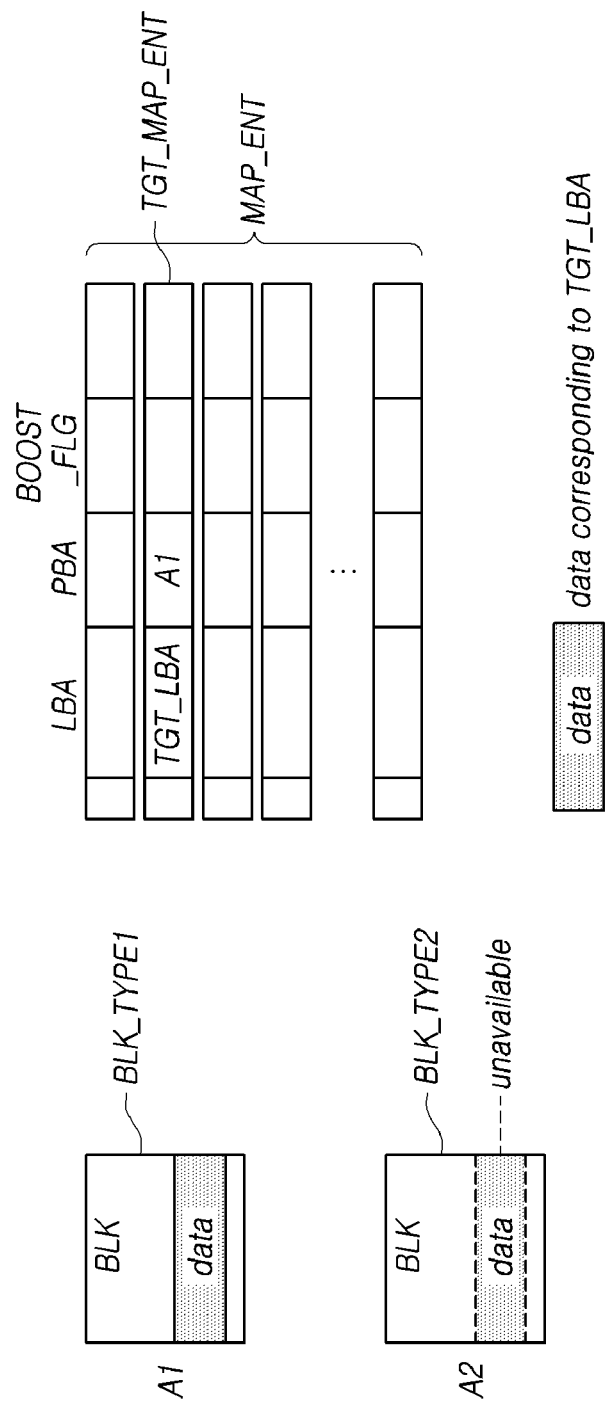
FIG. 11 illustrates an operation of restoring a mapping entry corresponding to a target logical address according to an embodiment of the present disclosure.

FIG. 11 illustrates an operation of restoring the mapping entry corresponding to the target logical address TGT_LBA according to an embodiment of the present disclosure.

Referring to FIG. 11, after setting the data corresponding to the target logical address TGT_LBA to be inaccessible in the second type memory block BLK_TYPE2, the memory controller 120 may search the mapping entry TGT_MAP_ENT corresponding to the target logical address TGT_LBA among the plurality of mapping entries MAP_ENT in the mapping table.

Referring to FIG. 11, a physical address at which the data corresponding to the target logical address TGT_LBA is stored in the first type memory block BLK_TYPE1 is A1, and a physical address at which the data corresponding to the target logical address TGT_LBA is stored in the second type memory block BLK_TYPE2 is A2.

In this case, the memory controller 120 may search the mapping entry TGT_MAP_ENT corresponding to the target logical address TGT_LBA among the plurality of mapping entries MAP_ENT, and reset the read boost flag BOOST_FLG in the mapping entry TGT_MAP_ENT corresponding to the target logical address TGT_LBA.

As described above, when the read boost mode for the target logical address TGT_LBA is reset, the data corresponding to the target logical address TGT_LBA may be read only from the first type memory block BLK_TYPE1.

Therefore, the memory controller 120 may reset the read boost flag BOOST_FLG corresponding to the target logical address TGT_LBA to indicate that the data corresponding to the target logical address TGT_LBA is read from the first type memory block BLK_TYPE1.

In this case, a physical address field PBA corresponding to the target logical address TGT_LBA may be set as A1, which indicates a location (e.g., physical address) where the data corresponding to the target logical address TGT_LBA is stored in the first type memory block BLK_TYPE1.

Figure 12:
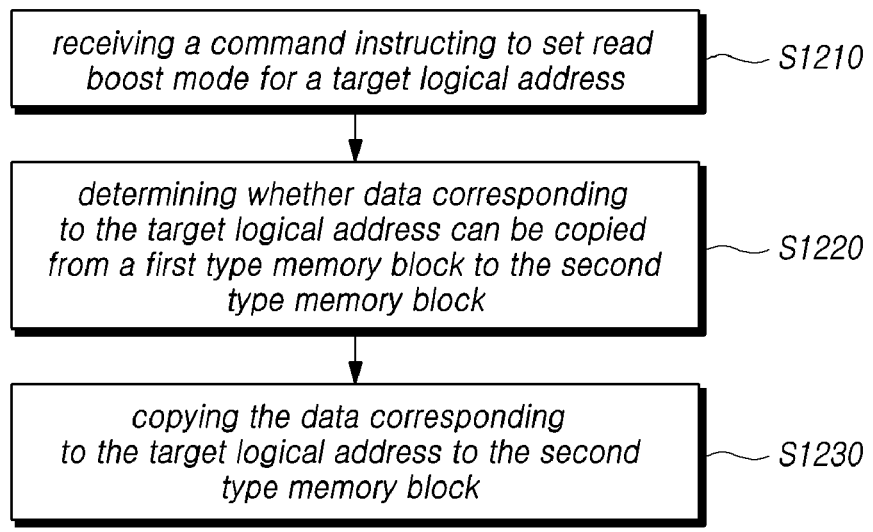
FIG. 12 illustrates an operating method of a memory system according to an embodiment of the present disclosure.

FIG. 12 illustrates an operating method according to an embodiment of the present disclosure. The operation method illustrated in FIG. 12 may be executed by the memory system 100 of FIG. 1.

Referring to FIG. 12, the operating method may include receiving a command CMD_SET to set a read boost mode for a target logical address TGT_LBA from an external device, e.g., the host HOST (S1210).

And the operating method may include determining whether data corresponding to the target logical address TGT_LBA can be copied from a first type memory block BLK_TYPE1 to a second type memory block BLK_TYPE2

(S1220). In this case, the second type memory block BLK_TYPE2 may operate at a higher speed than the first type memory block BLK_TYPE1.

For example, at S1220, it is determined that the data corresponding to the target logical address TGT_LBA can be copied to the second type memory block BLK_TYPE2 when the number of logical addresses for which the read boost mode is set is less than a threshold logical address number.

After that, the operating method may include copying the data corresponding to the target logical address TGT_LBA from the first type memory block BLK_TYPE1 to the second type memory block BLK_TYPE2 when it is determined that the data corresponding to the target logical address TGT_LBA can be copied to the second type memory block BLK_TYPE2 (S1230). The data corresponding to the target logical address TGT_LBA may be read from the second type memory block BLK_TYPE2 when the read boost mode is set for the target logical address TGT_LBA.

Meanwhile, the operating method may further include i) searching, after the data corresponding to the target logical address TGT_LBA is copied to the second type memory block BLK_TYPE2, a mapping entry TGT_MAP_ENT corresponding to the target logical address TGT_LBA among a plurality of mapping entries MAP_ENT each including mapping information between a logical address and a physical address, and ii) setting, in the mapping entry TGT_MAP_ENT corresponding to the target logical address TGT_LBA, a read boost flag BOOST_FLG to indicate that the read boost mode is set for the target logical address TGT_LBA, so that the data corresponding to the target logical address TGT_LBA is read from the second type memory block BLK_TYPE2.

The operating method may further include i) receiving a command CMD_RESET to reset the read boost mode set for the target logical address TGT_LBA from the external device, e.g., the host HOST, and ii) setting, when receiving the command CMD_RESET to reset the read boost mode set for the target logical address TGT_LBA, the data corresponding to the target logical address TGT_LBA stored in the second type memory block BLK_TYPE2 to be inaccessible.

The operating method may further include i) searching, after setting the data corresponding to the target logical address TGT_LBA stored in the second type memory block BLK_TYPE2 to be inaccessible, the mapping entry TGT_MAP_ENT corresponding to the target logical address TGT_LBA among the plurality of the mapping entries MAP_ENT, and ii) resetting the read boost flag BOOST_FLG in the mapping entry TGT_MAP_ENT corresponding to the target logical address TGT_LBA.

In this case, a location of a physical address PBA corresponding to the target logical address TGT_LBA in the mapping entry TGT_MAP_ENT corresponding to the target logical address TGT_LBA may be set as a location in which the data corresponding to the target logical address TGT_LBA is stored in the first type memory block BLK_TYPE1.

Figure 13:
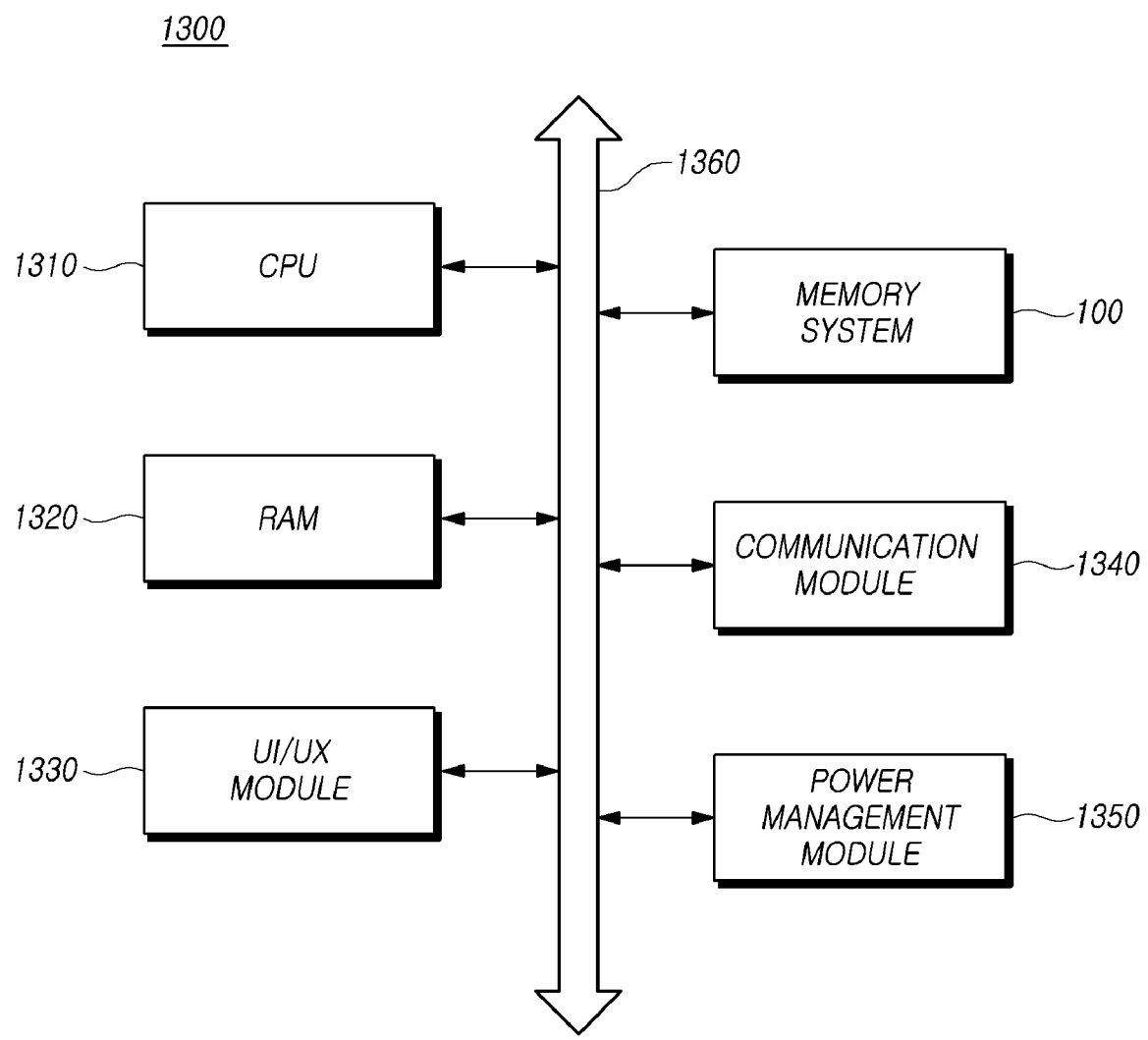
FIG. 13 illustrates a computing system based on some embodiments of the disclosed technology.

FIG. 13 illustrates a computing system 1300 based on an embodiment of the disclosed technology.

Referring to FIG. 13, the computing system 1300 may include a memory system 100 electrically connected to a system bus 1360, a CPU 1310 configured to control the overall operation of the computing system 1300, a RAM 1320 configured to store data and information related to operations of the computing system 1300, a user interface/user experience (UI/UX) module 1330 configured to provide a user with a user environment, a communication module 1340 configured to communicate with an external device as a wired and/or wireless type, and a power management module 1350 configured to manage power used by the computing system 1300.

The computing system 1300 may be a personal computer (PC) or may include a mobile terminal such as a smartphone, a tablet, or any of various electronic devices.

The computing system 1300 may further include a battery for supplying an operating voltage, and may further include an application chipset, a graphic-related module, a camera image processor, a DRAM, or the like. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, an operation delay time of a memory system may be advantageously reduced or minimized. In addition, based on an embodiment of the disclosed technology, an overhead occurring in a process of calling a specific function may be advantageously reduced or minimized. Although various embodiments have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A memory system, comprising:
 a memory device including a first type memory block storing data corresponding to a target logical address and a second type memory block operating at a higher speed than the first type memory block; and
 a memory controller configured to:
 determine, when receiving a command to set a read boost mode for the target logical address from outside of the memory system, whether the data corresponding to the target logical address can be copied from the first type memory block to the second type memory block; and
 copy, when it is determined that the data corresponding to the target logical address can be copied to the second type memory block, the data corresponding to the target logical address from the first type memory block to the second type memory block,
 wherein the memory controller is configured to read the data corresponding to the target logical address from the second type memory block when the read boost mode is set for the target logical address, and
 wherein the memory controller is further configured to:
 after the data corresponding to the target logical address is copied to the second type memory block, search a mapping entry corresponding to the target logical address among a plurality of mapping entries in a mapping table, each of the plurality of mapping entries storing mapping information between a logical address and a physical address, and set, in the mapping entry corresponding to the target logical address, a read boost flag to indicate whether the read boost mode is set for the target logical address.

2. The memory system of claim 1, wherein the memory controller is configured to:

determine that the data corresponding to the target logical address can be copied from the first type memory block to the second type memory block when a number of logical addresses for which the read boost mode is set is less than a threshold logical address number having a predetermined value.

3. The memory system of claim 1, wherein the memory controller is further configured to set, when receiving a command to reset the read boost mode set for the target logical address from outside of the memory system, the data corresponding to the target logical address to be inaccessible in the second type memory block.

4. The memory system of claim 3, wherein the memory controller is further configured to:

after setting the data corresponding to the target logical address to be inaccessible in the second type memory block, search the mapping entry corresponding to the target logical address among the plurality of mapping entries, and reset the read boost flag in the mapping entry corresponding to the target logical address.

5. The memory system of claim 4, wherein the memory controller is further configured to:

after the read boost mode set for the target logical address is reset, set a physical address corresponding to the target logical address in the mapping entry corresponding to the target logical address as a physical address of the first type memory block in which the data corresponding to the target logical address is stored.

6. A memory controller comprising:

a memory interface capable of communicating with a memory device including a first type memory block storing data corresponding to a target logical address and a second type memory block operating at a higher speed than the first type memory block; and a control circuit configured to:

determine, when receiving a command to set a read boost mode for the target logical address from outside of the memory system, whether the data corresponding to the target logical address can be copied from the first type memory block to the second type memory block, and copy, when it is determined that the data corresponding to the target logical address can be copied to the second type memory block, the data corresponding to the target logical address from the first type memory block to the second type memory block, wherein the control circuit is configured to read the data corresponding to the target logical address from the second type memory block when the read boost mode is set for the target logical address, and wherein the control circuit is configured to:

after the data corresponding to the target logical address is copied to the second type memory block, search a mapping entry corresponding to the target logical address among a plurality of mapping entries in a mapping table, each of the plurality of mapping entries storing mapping information between a logical address and a physical address, and set, in the mapping entry corresponding to the target logical address, a read boost flag to indicate whether the read boost mode is set for the target logical address.

7. The memory controller of claim 6, wherein the control circuit is configured to:

set, when receiving a command to reset the read boost mode set for the target logical address from outside of the memory system, the data corresponding to the target logical address to be inaccessible in the second type memory block.

8. An operating method of a memory system, the operating method comprising:

receiving a command to set a read boost mode for a target logical address from outside of the memory system;

determining whether data corresponding to the target logical address can be copied from a first type memory block, in which the data corresponding to the target logical address is stored, to a second type memory block operating at a higher speed than the first type memory block; and copying, when it is determined that the data corresponding to the target logical address can be copied to the second type memory block, the data corresponding to the target logical address from the first type memory block to the second type memory block;

after the data corresponding to the target logical address is copied to the second type memory block, searching a mapping entry corresponding to the target logical address among a plurality of mapping entries in a mapping table, each of the plurality of mapping entries storing mapping information between a logical address and a physical address; and setting, in the mapping entry corresponding to the target logical address, a read boost flag to indicate whether the read boost mode is set for the target logical address, wherein the data corresponding to the target logical address is read from the second type memory block when the read boost mode is set for the target logical address.

9. The operating method of claim 8, wherein the determining includes determining whether the data corresponding to the target logical address can be copied from the first type memory block to the second type memory block when a number of logical addresses for which the read boost mode is set is less than a threshold logical address number having a predetermined value.

10. The operating method of claim 8, further comprising:

receiving a command to reset the read boost mode set for the target logical address from outside of the memory system; and setting, when receiving the command to reset the read boost mode set for the target logical address, the data corresponding to the target logical address to be inaccessible in the second type memory block.

11. The operating method of claim 10, further comprising:

after setting the data corresponding to the target logical address to be inaccessible in the second type memory block, searching the mapping entry corresponding to the target logical address among the plurality of the mapping entries; and resetting the read boost flag in the mapping entry corresponding to the target logical address.

12. The operating method of claim 11, further comprising:

after the read boost mode set for the target logical address is reset, setting a physical address corresponding to the target logical address in the mapping entry corresponding to the target logical address as a physical address of the first type memory block in which the data corresponding to the target logical address is stored.

* * * * *